US012021271B1

(12) United States Patent
Xiong et al.

(10) Patent No.: US 12,021,271 B1
(45) Date of Patent: *Jun. 25, 2024

(54) ENERGY-STORAGE APPARATUS AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/395,083

(22) Filed: Dec. 22, 2023

(30) Foreign Application Priority Data

Feb. 9, 2023 (CN) .......................... 202310091042.X

(51) Int. Cl.
*H01M 50/645* (2021.01)
*H01M 50/103* (2021.01)
(Continued)

(52) U.S. Cl.
CPC ....... *H01M 50/645* (2021.01); *H01M 50/103* (2021.01); *H01M 50/15* (2021.01);
(Continued)

(58) Field of Classification Search
CPC .. H01M 50/645; H01M 50/103; H01M 50/15; H01M 50/16; H01M 50/533; H01M 50/543; H01M 50/531; H01M 50/54
See application file for complete search history.

(56) References Cited

U.S. PATENT DOCUMENTS

2012/0148908 A1* 6/2012 Ito ..................... H01M 50/176
  29/874
2013/0309534 A1* 11/2013 Suzuki ............... H01M 50/553
  429/94

FOREIGN PATENT DOCUMENTS

CN  207038571 U  2/2018
CN  207338460 U  5/2018
(Continued)

OTHER PUBLICATIONS

English translation of JP6530819B2—Hitachi Automotive systems Co. LTD. Jun. 12, 2019 (Year: 2019).*

(Continued)

*Primary Examiner* — Matthew T Martin
*Assistant Examiner* — Adam J Francis
(74) *Attorney, Agent, or Firm* — IP Spring

(57) ABSTRACT

An energy-storage apparatus and an electricity-consumption device are disclosed. The energy-storage apparatus includes a first tab, a first pole, a first connector, and a lower plastic assembly. The first connector is connected to the first tab and a flange portion of the first pole. A top cover defines a liquid-injection hole. A sealing plug includes a plug body. The lower plastic assembly at least includes a first-lower-plastic-member body. The first-lower-plastic-member body defines a hollow hole. In a thickness direction of the lower plastic assembly, the first-lower-plastic-member body is mounted on the top cover. The liquid-injection hole is positioned facing towards and is in communication with the hollow hole. The sealing plug seals the liquid-injection hole. The plug body extends through the liquid-injection hole and the hollow hole, and protrudes from a second surface of the first-lower-plastic-member body. The first connector is mounted on the second surface of the first-lower-plastic-member body.

20 Claims, 8 Drawing Sheets

(51) Int. Cl.
  *H01M 50/15* (2021.01)
  *H01M 50/16* (2021.01)
  *H01M 50/531* (2021.01)
  *H01M 50/533* (2021.01)
  *H01M 50/54* (2021.01)
  *H01M 50/543* (2021.01)

(52) U.S. Cl.
  CPC ......... *H01M 50/16* (2021.01); *H01M 50/533* (2021.01); *H01M 50/543* (2021.01); *H01M 50/531* (2021.01); *H01M 50/54* (2021.01)

(56) References Cited

FOREIGN PATENT DOCUMENTS

| CN | 212695284 U |   | 3/2021 |
| --- | --- | --- | --- |
| CN | 214898620 U | * | 11/2021 |
| CN | 214898620 U |   | 11/2021 |
| CN | 215496875 U |   | 1/2022 |
| CN | 216818576 U |   | 6/2022 |
| CN | 217788756 U |   | 11/2022 |
| CN | 218039759 U |   | 12/2022 |
| CN | 115579597 A |   | 1/2023 |
| CN | 115588817 A |   | 1/2023 |
| CN | 115621631 A |   | 1/2023 |
| CN | 115663362 A |   | 1/2023 |
| JP | 6530819 B2 | * | 6/2019 |
| JP | 2019175690 A |   | 10/2019 |

OTHER PUBLICATIONS

CNIPA, First Office Action for corresponding Chinese Patent Application No. 202310091042.X, Apr. 29, 2023, 22 pages.

CNIPA, Notice of Allowance for corresponding Chinese Patent Application No. 202310091042.X, May 24, 2023, 10 pages.

WIPO, International Search Report and Written Opinion for International Patent Application No. PCT/CN2023/075256, Jun. 23, 2023, 16 pages.

* cited by examiner

ENERGY-STORAGE APPARATUS AND ELECTRICITY-CONSUMPTION DEVICE

CROSS-REFERENCE TO RELATED APPLICATIONS

This application claims priority under 35 U.S.C. § 119(a) to Chinese Patent Application No. 202310091042.X, filed Feb. 9, 2023, the entire disclosure of which is incorporated herein by reference.

TECHNICAL FIELD

This disclosure relates to the field of energy-storage technology, and in particular to an energy-storage apparatus and an electricity-consumption device.

BACKGROUND

With continuous development of new-energy technologies, application ranges of secondary batteries, such as lithium batteries or sodium batteries, become wider and wider.

SUMMARY

In one aspect, an energy-storage apparatus is provided in the present disclosure. The energy-storage apparatus includes a housing, an electrode assembly, a first pole, a first connector, and an end cover assembly. The housing defines an accommodating cavity and an opening. The electrode assembly has a first tab. The first tab has an extension section. The first pole includes a post portion and a flange portion. The first connector has one end connected to the first tab, and the other end connected to the flange portion of the first pole. The end cover assembly has a top cover, a sealing plug, and a lower plastic assembly. The top cover has a first mounting face and a second mounting face positioned facing away from the first mounting face in a thickness direction of the top cover. The top cover further defines a liquid-injection hole extending through the first mounting face and the second mounting face. The sealing plug has a plug body. The lower plastic assembly at least includes a first-lower-plastic-member body. The first-lower-plastic-member body has a first surface and a second surface positioned facing away from the first surface in a thickness direction of the first-lower-plastic-member body. The first-lower-plastic-member body defines a hollow hole extending through the first surface and the second surface. In the thickness direction of the end cover assembly, a height h1 of part of the plug body protruding from the second surface is in a range from 0.8 mm to 4.8 mm. The first-lower-plastic-member body is assembled on the second mounting face. The liquid-injection hole is positioned facing towards and is in communication with the hollow hole. The sealing plug seals the liquid-injection hole. The plug body extends through the liquid-injection hole and the hollow hole, and extends from the second surface. The end cover assembly seals the opening. The electrode assembly is disposed in the accommodating cavity. The first tab is connected to the first connector. The extension section exceeds an end of the first connector in a length direction of the first connector, and blocks the hollow hole and the liquid-injection hole in a thickness direction of the end cover assembly. The plug body supports the extension section in the thickness direction of the end cover assembly. A gap d1 is defined between the extension section and the second mounting face of the top cover. The gap d1 between the extension section and the second mounting face of the top cover is in a range from 2 mm to 8 mm.

In another aspect, an electricity-consumption device is further provided in embodiments of the present disclosure. The electricity-consumption device includes the above energy-storage apparatus. The energy-storage apparatus is configured to power the electricity-consumption device. The energy-storage apparatus includes a housing, an electrode assembly, a first pole, a first connector, and an end cover assembly. The housing defines an accommodating cavity and an opening. The electrode assembly has a first tab. The first tab has an extension section. The first pole includes a post portion and a flange portion. The first connector has one end connected to the first tab, and the other end connected to the flange portion of the first pole. The end cover assembly has a top cover, a sealing plug, and a lower plastic assembly. The top cover has a first mounting face and a second mounting face positioned facing away from the first mounting face in a thickness direction of the top cover. The top cover further defines a liquid-injection hole extending through the first mounting face and the second mounting face. The sealing plug has a plug body. The lower plastic assembly at least includes a first-lower-plastic-member body. The first-lower-plastic-member body has a first surface and a second surface positioned facing away from the first surface in a thickness direction of the first-lower-plastic-member body. The first-lower-plastic-member body defines a hollow hole extending through the first surface and the second surface. In the thickness direction of the end cover assembly, a height h1 of part of the plug body protruding from the second surface is in a range from 0.8 mm to 4.8 mm. The first-lower-plastic-member body is assembled on the second mounting face. The liquid-injection hole is positioned facing towards and is in communication with the hollow hole. The sealing plug seals the liquid-injection hole. The plug body extends through the liquid-injection hole and the hollow hole, and extends from the second surface. The end cover assembly seals the opening. The electrode assembly is disposed in the accommodating cavity. The first tab is connected to the first connector. The extension section exceeds an end of the first connector in a length direction of the first connector, and blocks the hollow hole and the liquid-injection hole in a thickness direction of the end cover assembly. The plug body supports the extension section in the thickness direction of the end cover assembly. A gap d1 is defined between the extension section and the second mounting face of the top cover. The gap d1 between the extension section and the second mounting face of the top cover is in a range from 2 mm to 8 mm.

BRIEF DESCRIPTION OF THE DRAWINGS

To explain technical solutions in the present disclosure more clearly, the following will give a brief introduction to the accompanying drawings to be used in the implementations. The accompanying drawings in the following description are only some implementations of the present disclosure. For those of ordinary skill in the art, other accompanying drawings can be obtained according to these accompanying drawings.

DETAILED DESCRIPTION

Figure 1:
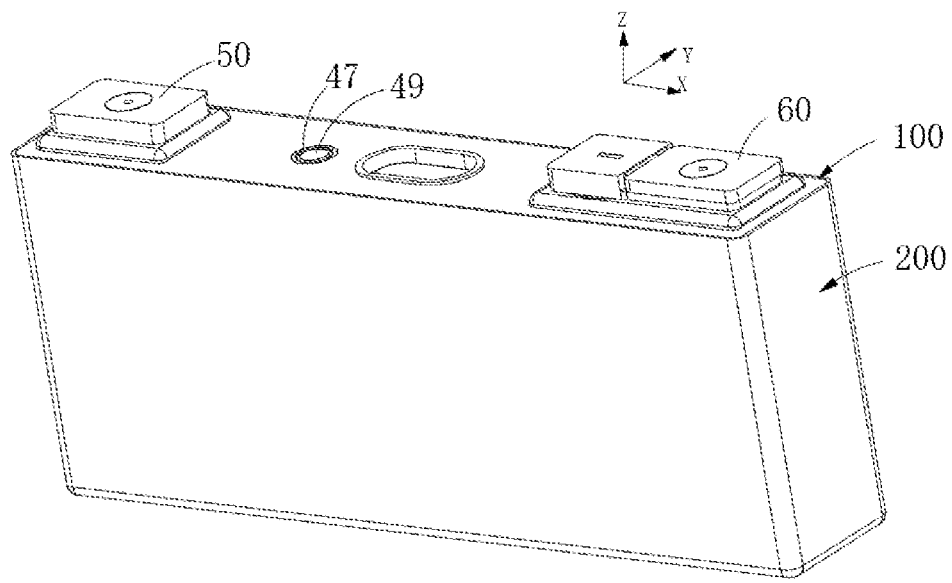
FIG. 1 is a schematic structural view of an energy-storage apparatus provided in an embodiment of the present disclosure.

Technical solutions of embodiments of the present disclosure will be described clearly with reference to accompanying drawings for embodiments of the present disclosure. Embodiments described herein are merely some embodiments, rather than all embodiments, of the present disclosure. Based on embodiments of the present disclosure, other embodiments obtained by those of ordinary skill in the art shall fall within the protection scope of the present disclosure.

With continuous development of new-energy technologies, application ranges of secondary batteries, such as lithium batteries or sodium batteries, become wider and wider. In the related art, for the secondary battery, a terminal post of an end cover assembly is connected to a tab of an electrode assembly by means of a connector. Since the terminal post of the end cover assembly and the tab of the electrode assembly are arranged in a staggered manner, and the connector is connected to the terminal post and the tab, resulting in a relatively large gap, which is not conducive to utilization of inner space of the secondary battery, and reduces energy density of the secondary battery.

An energy-storage apparatus capable of improving energy density is provided in the present disclosure.

An electricity-consumption device is further provided in the present disclosure.

In one aspect, an energy-storage apparatus is provided in the present disclosure. The energy-storage apparatus includes a housing, an electrode assembly, a first pole, a first connector, and an end cover assembly. The housing defines an accommodating cavity and an opening. The electrode assembly has a first tab. The first tab has an extension section. The first pole includes a post portion and a flange portion. The first connector has one end connected to the first tab, and the other end connected to the flange portion of the first pole. The end cover assembly has a top cover, a sealing plug, and a lower plastic assembly. The top cover has a first mounting face and a second mounting face positioned facing away from the first mounting face in a thickness direction of the top cover. The top cover further defines a liquid-injection hole extending through the first mounting face and the second mounting face. The sealing plug has a plug body. The lower plastic assembly at least includes a first-lower-plastic-member body. The first-lower-plastic-member body has a first surface and a second surface positioned facing away from the first surface in a thickness direction of the first-lower-plastic-member body. The first-lower-plastic-member body defines a hollow hole extending through the first surface and the second surface. In the thickness direction of the end cover assembly, a height h1 of part of the plug body protruding from the second surface is in a range from 0.8 mm to 4.8 mm. The first-lower-plastic-member body is assembled on the second mounting face. The liquid-injection hole is positioned facing towards and is in communication with the hollow hole. The sealing plug seals the liquid-injection hole. The plug body extends through the liquid-injection hole and the hollow hole, and extends from the second surface. The end cover assembly seals the opening. The electrode assembly is disposed in the accommodating cavity. The first tab is connected to the first connector. The extension section exceeds an end of the first connector in a length direction of the first connector, and blocks the hollow hole and the liquid-injection hole in a thickness direction of the end cover assembly. The plug body supports the extension section in the thickness direction of the end cover assembly. A gap d1 is defined between the extension section and the second mounting face of the top cover. The gap d1 between the extension section and the second mounting face of the top cover is in a range from 2 mm to 8 mm.

The energy-storage apparatus in an embodiment of the present disclosure may include, but is not limited to, a single battery, a battery module, a battery pack, a battery system, and the like. In this embodiment, for example, the energy-storage apparatus is a single battery. The liquid-injection hole is sealed by the sealing plug to prevent an electrolyte inside the battery from flowing out of the battery. The plug body extends through the liquid-injection hole and the hollow hole in the first-lower-plastic-member body, and protrudes from the second surface. The terminal post extends through the first-lower-plastic-member body at one side of the first-lower-plastic-member body away from the hollow hole, and is electrically connected to the first tab. The plug body of the sealing plug supports the extension section of the first tab extending above the hollow hole, so that the extension section of the first tab is prevented from being bent and warped towards the top cover and abutting against the top cover due to an influence of environmental factors such as collision, heating, and the like. Thus, the short circuit between the first tab and the top cover due to the electrical connection between the first tab and the top cover is prevented. Therefore, the safety performance of the battery can be effectively protected.

In an embodiment, a gap between the extension section and the second mounting face of the top cover is in a range from 2 mm to 8 mm. In this range, there is a sufficient gap to prevent the top cover and the extension section from being short-circuited. In addition, the first tab is prevented from being excessively bent and broken due to an excessive gap.

In an embodiment, the top cover includes a liquid-injection recess recessed from the first mounting face. A protrusion protrudes from the second mounting face. In the thickness direction of the top cover, the liquid-injection hole extends through a groove bottom-wall of the liquid-injection recess and the protrusion. The protrusion is accommodated in the hollow hole. The sealing plug has a cover body accommodated in the liquid-injection recess. A gap d2 is defined between a hole wall of the hollow hole and a peripheral wall of the protrusion. The protrusion is exposed beyond the second surface of the first-lower-plastic-member body.

In this embodiment, the protrusion is disposed at a position corresponding to the liquid-injection hole. The liquid-injection recess is first defined on the top cover, and then the liquid-injection hole extends through the groove bottom-wall of the liquid-injection recess and the protrusion. In this way, the electrolyte injected can be prevented from spilling over an outer surface of the top cover, thereby ensuring that the liquid-injection hole is not blocked and liquid-injection efficiency is higher. Meanwhile, the protrusion is positioned in the hollow hole and is at a distance from the hollow hole. Therefore, when the first-lower-plastic-member body is assembled, precision requirements for parts aligned and assembled with the liquid-injection hole can be reduced, thereby reducing production costs and improving assembly efficiency.

In an embodiment, the gap between the hole wall of the hollow hole and the peripheral wall of the protrusion is in a range from 0.05 mm to 2.85 mm. In this way, the protrusion is exposed beyond the second surface of the first-lower-plastic-member body. There is a sufficient error margin for assembly between the first-lower-plastic-member body and the top cover. There is also no shaking caused by inaccurate positioning of the first-lower-plastic-member body due to an excessive gap.

In an embodiment, the first-lower-plastic-member body further includes a support rib. The first connector is connected to the second surface of the first-lower-plastic-member body and is fixedly connected to a flange portion of the first pole. The support rib protrudes from the second surface and is positioned at one side of the hollow hole. In the thickness direction of the first-lower-plastic-member body, the support rib abuts against the first connector.

In an embodiment, the support rib includes at least one first sub-rib and at least one second sub-rib. The at least one first sub-rib and the at least one second sub-rib are disposed in an intersected manner.

In this embodiment, the support rib is H-shaped or cross-shaped. The support rib includes the at least one first sub-rib and the at least one second sub-rib. The first sub-rib and the second sub-rib are disposed in an intersected manner. Due to arrangement of the support rib, a structural strength of the first-lower-plastic-member body in the width direction of the first-lower-plastic-member body is improved to avoid bending. In addition, the support rib is also configured to support an extension portion of the first connector, so that the first connector tends to be flat and is prevented from being bent.

In an embodiment, a height h2 of the support rib protruding from the second surface is less than the height h1 of part of the plug body protruding from the second surface. The height of the support rib is adapted to the thickness of the first connector. The height of part of the plug body protruding from the second surface is adapted to a height of the extension portion of the first tab exceeding the first connector. Therefore, the first connector and the first tab tend to be flat as a whole, thereby avoiding warpage due to bending of the first connector or the first tab during subsequent use.

In an embodiment, in the thickness direction of the end cover assembly, the height of part of the plug body protruding from second surface is in a range from 0.8 mm to 4.8 mm. In other embodiments, the height of part of the plug body protruding from second surface may be 1.2 mm. In this height range, the plug body can effectively support the first tab, and the first tab is prevented from being connected to the top cover when the first tab is bent. In addition, a gap due to the extension portion of the first tab being lifted too high is avoided, thereby avoiding wasting the internal space of the energy-storage apparatus, and avoiding reducing the energy density of the energy-storage apparatus.

In an embodiment, a ratio of a radius of the hollow hole to a maximum radius of the protrusion is in a range from 1.05 to 2.45, and a specific value is 1.15.

In an embodiment, the first-lower-plastic-member body further includes a first protective wall. The first protective wall includes a first sub-wall and two second sub-walls. The first sub-wall protrudes from the second surface at one end of the second surface and is close to the hollow hole. The two second sub-walls protrude from the second surface at two opposite sides of the second surface. The two second sub-walls are connected to two ends of the first sub-wall. The two second sub-walls, the first sub-wall, and part of the second surface cooperatively define a first limiting groove. The first connector and the first tab are accommodated in the first limiting groove. The first protective wall is U-shaped. In practice, the first protective wall is positioned outside three edges of the first connector, and is configured for limiting the first connector and preventing the first connector from being bent and misaligned.

In an embodiment, an insulating film is further sandwiched in the first connector. A height of the first protective wall protruding from the second surface is greater than a sum of a thickness of the first connector, a thickness of the insulating film, and a thickness of the first tab. It is ensured that the first connector and the first tab may be positioned in the U-shaped groove defined by the first protective wall in the thickness direction of the end cover assembly. Therefore, a welding portion between the first connector and the first tab is avoided from being bumped during subsequent assembly, thereby avoiding the first tab from being fractured. Meanwhile, after adhesiveness of an insulating adhesive that matches the first connector and the first tab fails, the insulating adhesive may be prevented from drifting out of the first protective wall, thereby avoiding insulation failure.

In an embodiment, the first connector includes a first body and a second body connected to one side of the first body. The first body and the second body are partially connected and folded relative to each other along a junction between the first body and the second body. The first tab is fixedly connected to the first body. The extension section exceeds the first body. The second body has one end that is positioned facing away from the first body and fixedly connected to the flange portion of the first pole.

In this embodiment, the first connector is accommodated in a first limiting groove. Since the first tab is relatively long and may extend to the liquid-injection hole, the second body folded can pad the first tab in the thickness direction, to increase a gap between an extension section of the first tab and a lower surface of the top cover. Thus, the extension section of the first tab is prevented from abutting against the top cover due to warpage, thereby avoiding a short circuit between the top cover and the electrode assembly, and avoiding reduction of the safety performance of the battery.

In an embodiment, the second connector includes a third body and a fourth body connected to one side of the third body. The third body and the fourth body are partially connected and folded relative to each other along a junction between the third body and the fourth body. The second tab is fixedly connected to the third body. The extension section exceeds the third body. The fourth body has one end that is positioned facing away from the third body and is fixedly connected to the flange portion of the second pole. The second protective wall is U-shaped. The second protective wall is positioned outside three edges of the second connector, and is configured for limiting and preventing the second connector from being bent and misaligned.

In an embodiment, an insulating film is further stacked on the second connector. A height of the second protective wall protruding from the fourth surface is greater than a sum of a thickness of the second connector, a thickness of the insulating film, and a thickness of the second tab. It is ensured that the second connector and the second tab may be positioned in a U-shaped groove defined by the second protective wall in the thickness direction of the end cover assembly. Therefore, a welding portion between the second connector and the second tab is avoided from being bumped during subsequent assembly, thereby avoiding the second tab from being fractured. Meanwhile, after adhesiveness of an insulating adhesive that matches the second connector and the second tab fails, the insulating adhesive may be prevented from drifting out of the second protective wall, thereby avoiding insulation failure.

In an embodiment, the energy-storage apparatus further includes a second pole. The second pole has a flange portion. The fourth surface of the second-lower-plastic-member body has a first region and a second region connected to the first region in a length direction of the second-lower-plastic-member body. In the thickness direction of the second-lower-plastic-member body, a height of the first region is greater than a height of the second region. The second connector includes a third body and a fourth body connected to one side of the third body. The third body and the fourth body are partially connected and folded relative to each other along a junction between the third body and the fourth body. The second connector is mounted on the fourth surface. The third body and the fourth body are mounted in the second region. The third body is fixedly connected to the flange portion of the second pole. In the thickness direction of the second-lower-plastic-member body, the second tab is fixedly connected to the fourth body. The second tab is flush with a surface of the fourth body positioned facing away from the second-lower-plastic-member body.

In this embodiment, the fourth surface of the second-lower-plastic-member body is not a flat surface, and regions with different heights are formed at intervals by an inclined surface. In the thickness direction, the second region, which is recessed relative to the first region towards the top cover, is configured for accommodating and wrapping the fourth body (a portion with a thicker thickness) of the second connector which is welded with the second tab. The second tab bent keeps flush with a surface of the fourth body of the second connector positioned facing away from the second-lower-plastic member. Therefore, the thickness space, of the second lower plastic member, occupied by the second connector may be reduced as a whole. For the whole system of the energy-storage apparatus, a gap at the connector corresponding to a positive/negative electrode side is reduced as a whole, thereby improving the energy density of the whole energy-storage apparatus.

In an embodiment, the fourth surface has a connection surface. The connection surface is an inclined surface. The connection surface is connected to the first region and the second region at two opposites sides of the connection surface. In the thickness direction of the second-lower-plastic-member body, a height difference between the first region and the second region is in a range from 0.25 mm to 2.85 mm. This height difference range is adapted to the thickness of the first connector. An excessively recessed depth in the second region is avoided, so that the excessively thin wall thickness in the second region is avoided, thereby avoiding reducing the structural strength of the second-lower-plastic-member body. In addition, the first region and the second region are transitioned through the inclined surface, so that bending of the first body and a first tab can be alleviated.

In another aspect, an electricity-consumption device is further provided in embodiments of the present disclosure. The electricity-consumption device includes the above energy-storage apparatus. The energy-storage apparatus is configured to power the electricity-consumption device.

For the energy-storage apparatus in the embodiments of the present disclosure, with the arrangement of the first connector folded and the second connector folded, the gap between the end cover assembly and the electrode assembly is reduced. Therefore, the utility rate of the space inside the energy-storage apparatus is improved, and the energy density of the energy-storage apparatus is further improved. After the first connector is folded and second connector is folded, the gap between the tab fixedly connected to the first connector and the top cover is reduced, and the gap between the tab fixedly connected to the second connector and the top cover is reduced. The plug body of the sealing plug supports the extension section of the tab extending above the liquid-injection hole, so that the extension section of the tab is prevented from being bent and warped towards the top cover and abutting against the top cover due to the influence of environmental factors such as collision, heating, and the like. Thus, the short circuit between the first tab and the top cover due to the electrical connection between the first tab and the top cover is prevented. Therefore, the energy density of the energy-storage apparatus can be further increased while the safety performance of the energy-storage apparatus is improved.

As illustrated in FIG. 1, FIG. 2, FIG. 10, and FIG. 11, an energy-storage apparatus 1000 and an electricity-consumption device 1 adopting the energy-storage apparatus 1000 are provided in the present disclosure. In an embodiment, for example, an energy-storage apparatus 1000 is a battery. The energy-storage apparatus 1000 includes a housing 200, an end cover assembly 100, and a cell 260. The housing 200 defines an opening 210 and an accommodating cavity 220. The cell 260 and an electrode assembly 400 of the cell 260 are accommodated in the accommodating cavity 220 of the housing 200. The housing 200 wraps around both the periphery and the bottom of the cell 260. The end cover assembly 100 is mounted at one end of the cell 260, and the end cover assembly 100 seals the opening 210 of the housing 200. The cell 260 is connected to the first tab 400*a* and the second tab 400*b*, and the first tab 400*a* is insulated from the second tab 400*b*.

It may be understood that the energy-storage apparatus 1000 may include, but is not limited to, a single battery, a battery module, a battery pack, a battery system, and the like. When the energy-storage apparatus 1000 is a single battery, the energy-storage apparatus 1000 may be a prismatic cell.

For example, the electricity-consumption device 1 may be a vehicle. The vehicle may be a fuel vehicle, a gas vehicle, or a new-energy vehicle. The new-energy vehicle may be a pure electric vehicle, a hybrid electric vehicle, an extended-range electric vehicle, etc. A vehicle includes a battery, a controller, and a motor. The battery is configured to power the controller and the motor, and is used as a power supply for operation and driving of the vehicle. For example, the battery is used for operational power requirements during starting, navigation, and operation of the vehicle. For another example, the battery powers the controller, the controller controls the battery to power the motor, and the motor receives power from the battery and uses the power to drive the vehicle, thereby replacing or partially replacing fuel oil or natural gas to provide driving power for the vehicle. It may be understood that a practical application scenario of the energy-storage apparatus 1000 provided in embodiments of the present disclosure may be, but is not limited to, the listed products, and may also be other application scenarios, which is not strictly limited in the embodiments of the present disclosure.

For the convenience of illustration, a length direction of an end cover assembly illustrated in FIG. 1 is defined as an X-axis direction. A width direction of the end cover assembly illustrated in FIG. 1 is defined as a Y-axis direction. A height direction of the end cover assembly illustrated in FIG. 1 is defined as a Z-axis direction. The X-axis direction, the Y-axis direction, and the Z-axis direction are perpendicular to one another. Orientational terms such as "upper", "lower", "top", "bottom", etc., mentioned in description of embodiments of the present disclosure are described based on orientations as illustrated in FIG. 1 of the specification. "Upper" refers to a direction towards a positive direction of the Z-axis, and "lower" refers to a direction towards a negative direction of the Z-axis, which do not form a limitation to the energy-storage apparatus in practical application scenarios.

As illustrated in FIG. 3, FIG. 4, FIG. 5, and FIG. 10 together, the energy-storage apparatus 1000 includes an end cover assembly 100, an electrode assembly 400, a first connector 310 for connecting the electrode assembly 400 and a positive electrode of the end cover assembly 100, and a second connector 320 for connecting the electrode assembly 400 and a negative electrode of the end cover assembly 100.

Figure 6:
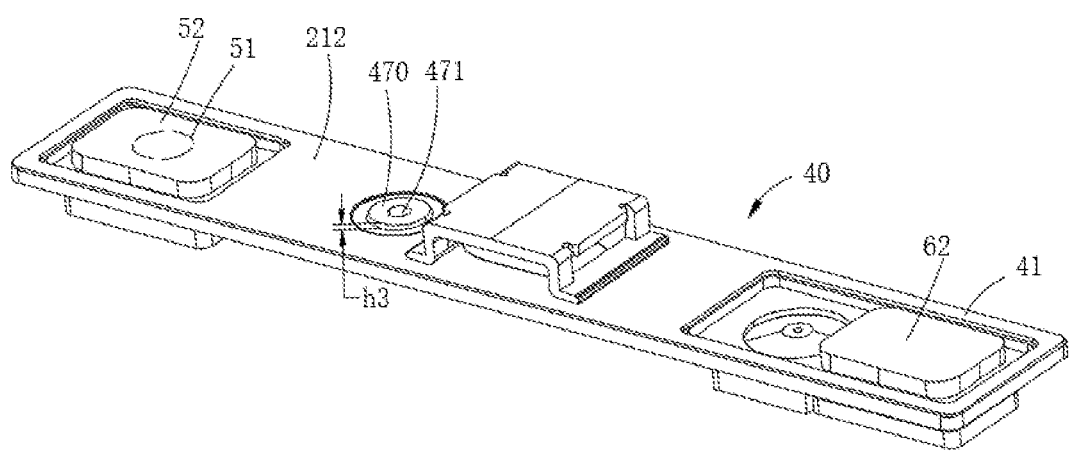
FIG. 6 is a schematic structural view of a top cover of the energy-storage apparatus illustrated in FIG. 5, viewed from another direction.
Figure 7:
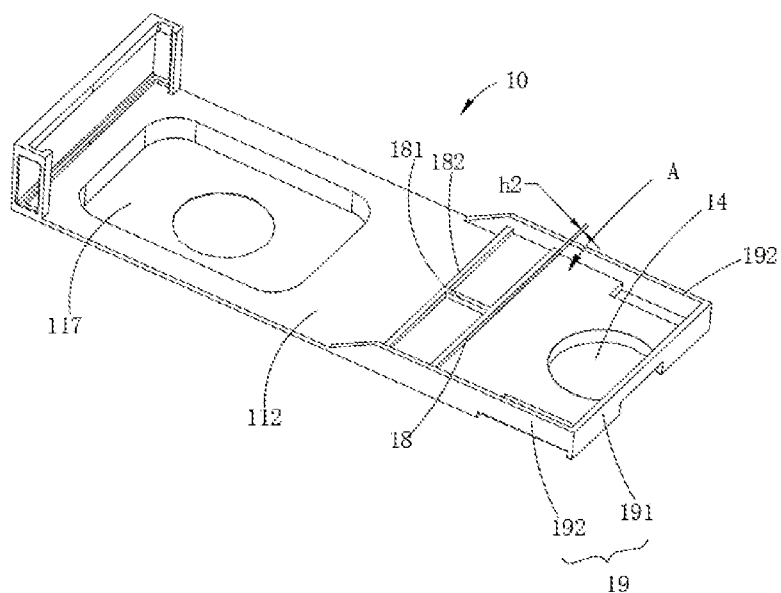
FIG. 7 is a schematic structural view of a first lower plastic member of the energy-storage apparatus illustrated in FIG. 5.
Figure 8:
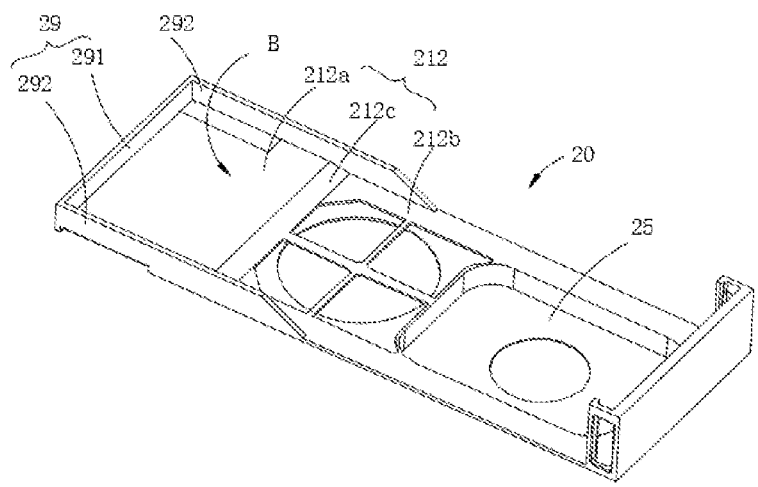
FIG. 8 is a schematic structural view of a second lower plastic member of the energy-storage apparatus illustrated in FIG. 5.

The end cover assembly 100 includes a lower plastic assembly 30 and a top cover 40. The lower plastic assembly 30 is mounted to the top cover 40. In this embodiment, the top cover 40 is a smooth aluminum part. The lower plastic assembly 30 is made of plastic material and is insulated. The end cover assembly 100 further includes an upper plastic assembly (not illustrated in FIG. 4), a first pole 50, and a second pole 60. In other embodiments, the upper plastic assembly is fixedly connected to the top cover 40. The first pole 50 and the second pole 60 are arranged side by side at intervals a length direction (i.e., the X-axis direction) of the end cover assembly 100. The first pole 50 and the second pole 60 each are insulated from the top cover 40 (for example, insulated by the upper plastic assembly). As illustrated in FIG. 6, the first pole 50 includes a post portion 51 and a flange portion 52. The post portion 51 is connected to the flange portion 52. The post portion 51 extends through the top cover 40. The second pole 60 includes a post portion (not illustrated) and a flange portion 62. The flange portion 52 of the first pole 50 is configured to be in contact with and be electrically connected to the first connector 310. The flange portion 62 of the second pole 60 is configured to be electrically connected to the second connector 320.

Figure 2:
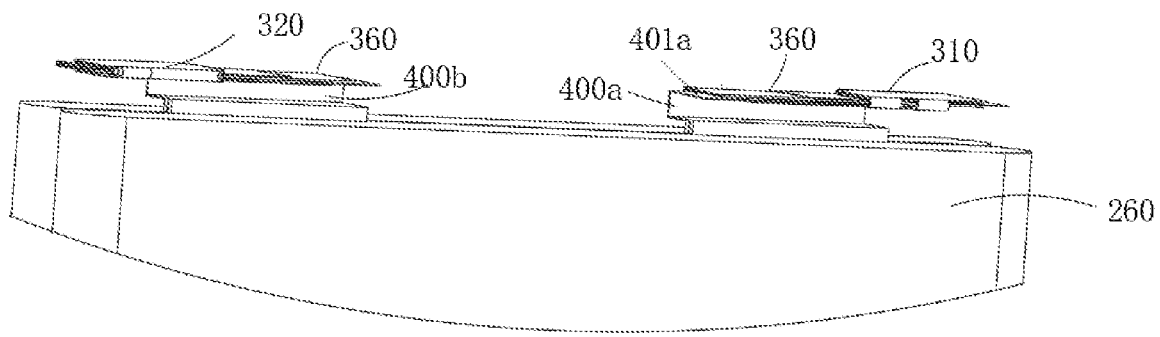
FIG. 2 is a partial exploded structural schematic view of the energy-storage apparatus illustrated in FIG. 1.
Figure 3:
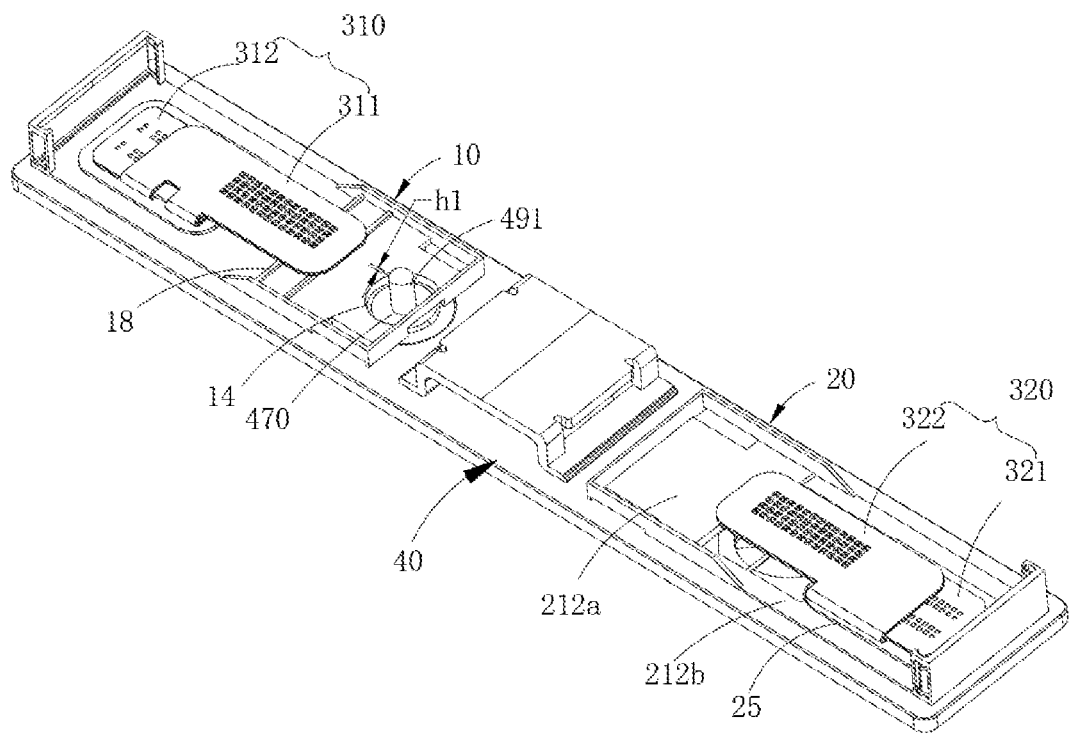
FIG. 3 is a partial schematic structural view of the energy-storage apparatus illustrated in FIG. 1.

As illustrated in FIG. 2, FIG. 3, and FIG. 6, the first connector 310 has a double-layer folded structure, and includes a first body 311 and a second body 312. The first body 311 and the second body 312 each are a rectangular multi-layer metal sheet. In the length direction of the end cover assembly 100, the length of the first body 311 is greater than the length of the second body 312. One side of the first body 311 is connected to one side of the second body 312, so that the first body 311 can be rotated and folded relative to the second body 312. The first tab 400a is sandwiched between multiple layers of the first body 311 and exceeds the first body 311. The first tab 400a is partially stacked with the first body 311 and the second body 312 (the length of the first tab 400a is different from each of the length of the first body 311 and the length of the second body 312, so only part of the first tab 400a is stacked with the first body 311 and the second body 312). The first tab 400a has an extension section 401a exceeding an end of the first connector 310 (e.g., the first body 311) and is away from the second body 312 in the length direction of the end cover assembly 100. The first tab 400a has the other end connected to the flange portion 52 of the first pole 50. The second body 312 and part of the first tab 400a are in contact with and electrically connected to the flange portion 52 of the first pole 50 of the energy-storage apparatus 1000. The first connector 310 mainly serves as a function of connection and conduction (between the first pole 50 and the first tab 400a) in the energy-storage apparatus 1000.

The second connector 320 is a double-layer folded structure, and includes a third body 321 and a fourth body 322. The third body 321 and the fourth body 322 each are a rectangular multi-layer metal sheet. In the length direction of the end cover assembly 100, the length of the third body 321 is less than the length of the fourth body 322. One side of the third body 321 is connected to one side of the fourth body 322, so that the third body 321 can be rotated and folded relative to the fourth body 322 or the third body 321 and the fourth body 322 can be folded in half. The third body 321 is in contact with (partially stacked with) and electrically connected to the flange portion 62 of the second pole 60 of the energy-storage apparatus 1000. The second tab 400b is sandwiched between multiple layers of the third body 321. The second connector 320 mainly serves as a function of connection and conduction (between the second pole 60 and the second tab 400b) in the energy-storage apparatus 1000.

Figure 4:
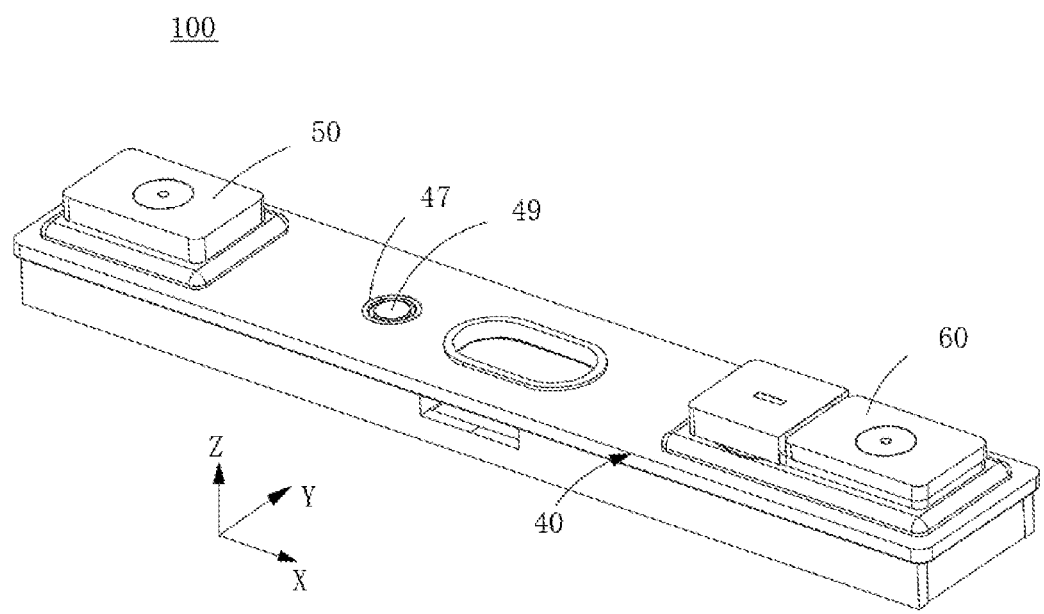
FIG. 4 is a schematic structural view of an end cover assembly of the energy-storage apparatus illustrated in FIG. 1.
Figure 5:
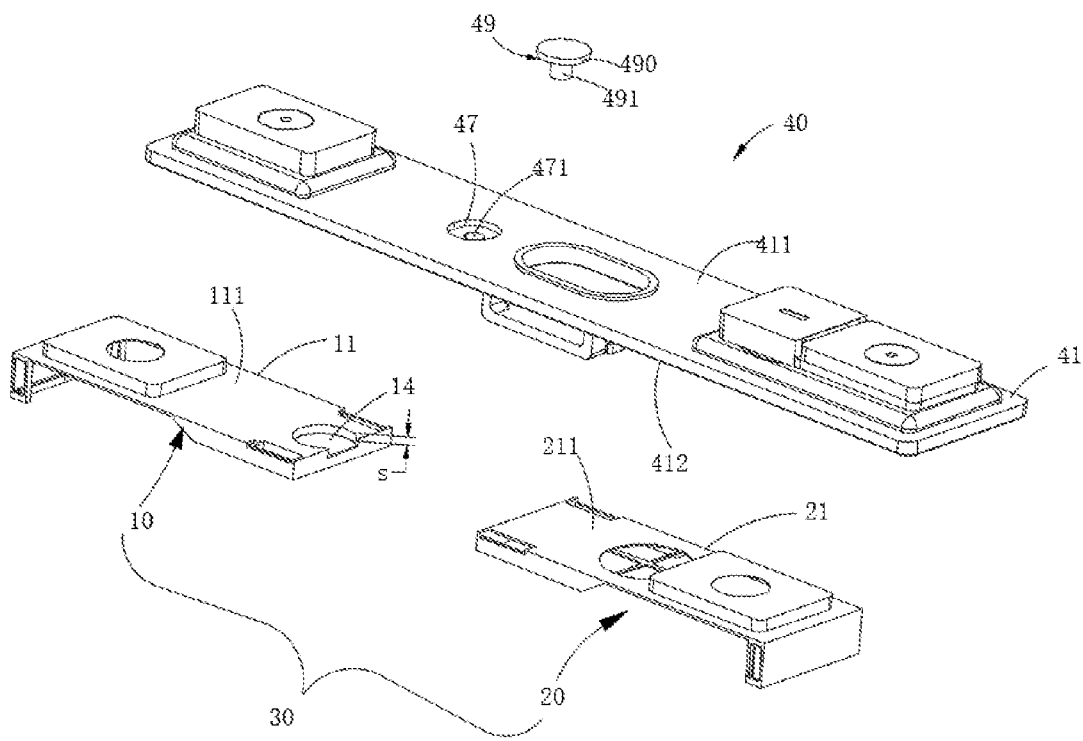
FIG. 5 is a partial exploded schematic structural view of the end cover assembly of the energy-storage apparatus illustrated in FIG. 4.

As illustrated in FIG. 4, FIG. 5, and FIG. 6, in this embodiment, the top cover 40 includes a top-cover body 41 and a sealing plug 49. The top-cover body 41 defines a liquid-injection hole 471. In a liquid-injection process of a power battery, an electrolyte is injected into the battery through the injection hole 471 on the top cover 40. In other embodiments, the top-cover body 41 is an elongated thin plate, and includes a first mounting face 411 and a second mounting face 412 positioned facing away the first mounting face 411. The liquid-injection hole 471 extends through the first mounting face 411 and the second mounting face 412. The sealing plug 49 is fitted into the liquid-injection hole 471 from the first mounting face 411 and seals the liquid-injection hole 471.

In this embodiment, the first mounting face 411 further defines liquid-injection recess 47. The liquid-injection recess 47 is recessed from the first mounting face 411. A protrusion 470 protrudes from the second mounting face 412. The protrusion 470 is formed by the liquid-injection recess 47 being recessed from the first mounting face 411, and protrudes from the second mounting face 412. In the thickness direction of the top cover 40, the liquid-injection hole 471 extends through a groove bottom-wall of the liquid-injection recess 47 and the protrusion 470. The liquid-injection recess 47 is a circular recess.

The sealing plug 49 includes a cover body 490 and a plug body 491. The cover body 490 is adapted to the liquid-injection recess 47. In this embodiment, the sealing plug 49 is a circular rubber plug. The plug body 491 is a post-like body, and protrudes from one surface of the cover body 490. In practice, the cover body 490 and the plug body 491 are integrally formed. An end surface of the plug body 491 away from the cover body 490 is a flat surface, and is configured to abut against the first tab 400a without causing damage. The sealing plug 49 is partially accommodated in and seals the liquid-injection recess 47. In other embodiments, the cover body 490 is accommodated in and seals the liquid-injection recess 47. The plug body 491 extends through the liquid-injection hole 471, is partially positioned in the liquid-injection hole 471, and partially protrudes from the protrusion 470 to be exposed beyond the second mounting face 412.

As illustrated in FIG. 5, in this embodiment, the lower plastic assembly 30 includes a first lower plastic member 10 and a second lower plastic member 20. The first lower plastic member 10 includes a first-lower-plastic-member body 11. The second lower plastic member 20 includes a second-lower-plastic-member body 12. The first lower plastic member 10 and the second lower plastic member 20 are mounted side by side in the X-axis direction at one side of the top cover 40. The first lower plastic member 10 and the second lower plastic member 20 each are stacked on the top cover 40. The width of the first lower plastic member 10 and the width of the second lower plastic member 20 each are the same as the width of the top cover 40, where a certain tolerance range is allowed. In this embodiment, the first lower plastic member 10 and the second lower plastic member 20 each are an independent part. In other embodiments, the first lower plastic member 10 and the second lower plastic member 20 are integrally formed.

Figure 9:
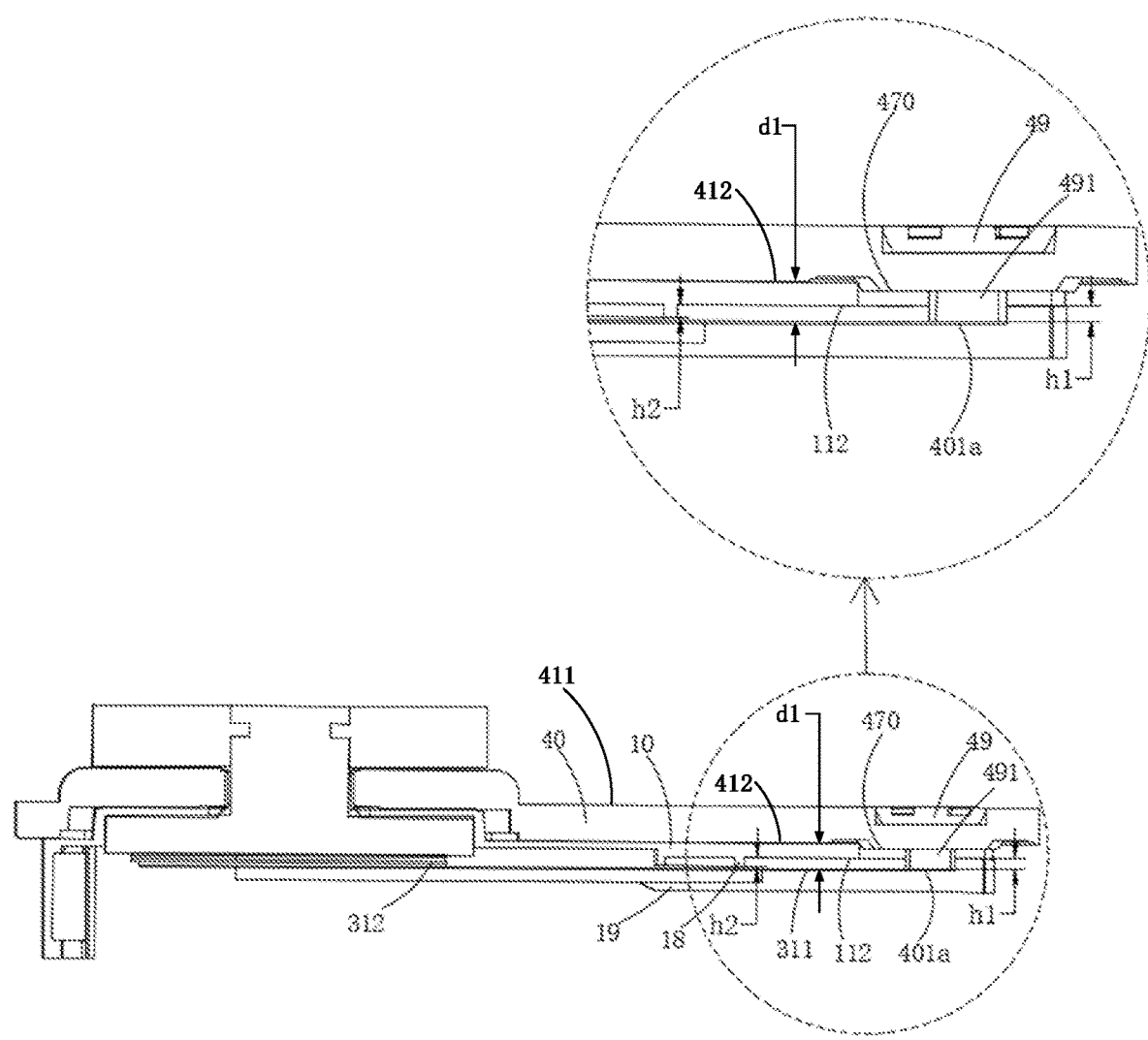
FIG. 9 is a partial schematic side view illustrating an internal structure of an energy-storage apparatus according to the present disclosure.

As illustrated in FIG. 5, FIG. 6, and FIG. 9, in this embodiment, the first-lower-plastic-member body 11 has a first surface 111 and a second surface 112 positioned facing away from the first surface 111. The first-lower-plastic-member body 11 defines a hollow hole 14 extending through the first surface 111 and the second surface 112. In the thickness direction of the end cover assembly 100, the first-lower-plastic-member body 11 is mounted on the second mounting face 412 of the top cover 40. The first surface 111 is positioned facing towards and connected to the second mounting face 412. The liquid-injection hole 471 is positioned facing towards and in communication with the hollow hole 14. The protrusion 470 is accommodated in the hollow hole 14. A minimum gap d2 (since the protrusion 470 is a conical frustum, the protrusion 470 has a large diameter and a small diameter, and d2 is a gap between one end of the protrusion 470 with the small diameter and a hole wall of the hollow hole 14) is defined between the hole wall of the hollow hole 14 and a peripheral wall of the protrusion 470. A cross-sectional area of the hollow hole 14 is greater than a cross-sectional area of the protrusion 470, so that the protrusion 470 is exposed beyond the second surface 112 of the first-lower-plastic-member body 11.

Figure 10:
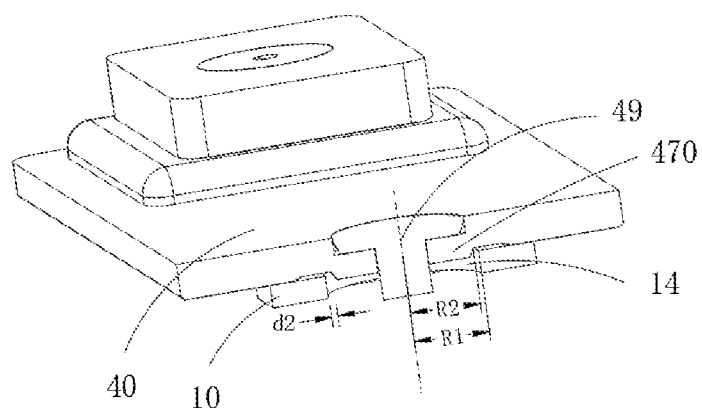
FIG. 10 is a partial schematic side view illustrating an internal structure of an energy-storage apparatus according to the present disclosure, viewed from another direction.
Figure 11:
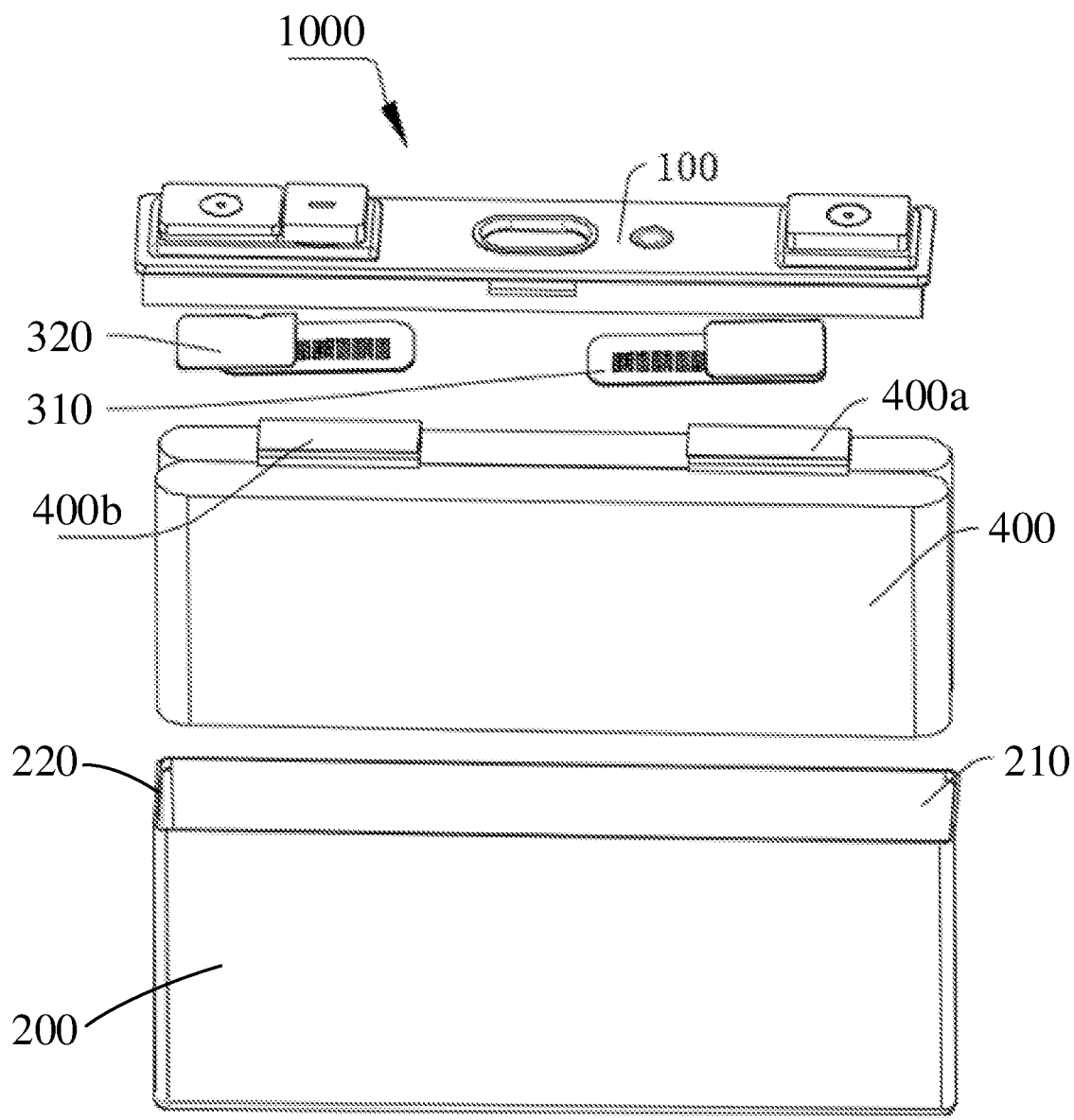
FIG. 11 is an exploded schematic structural view of an energy-storage apparatus provided in an embodiment of the present disclosure.
Figure 12:
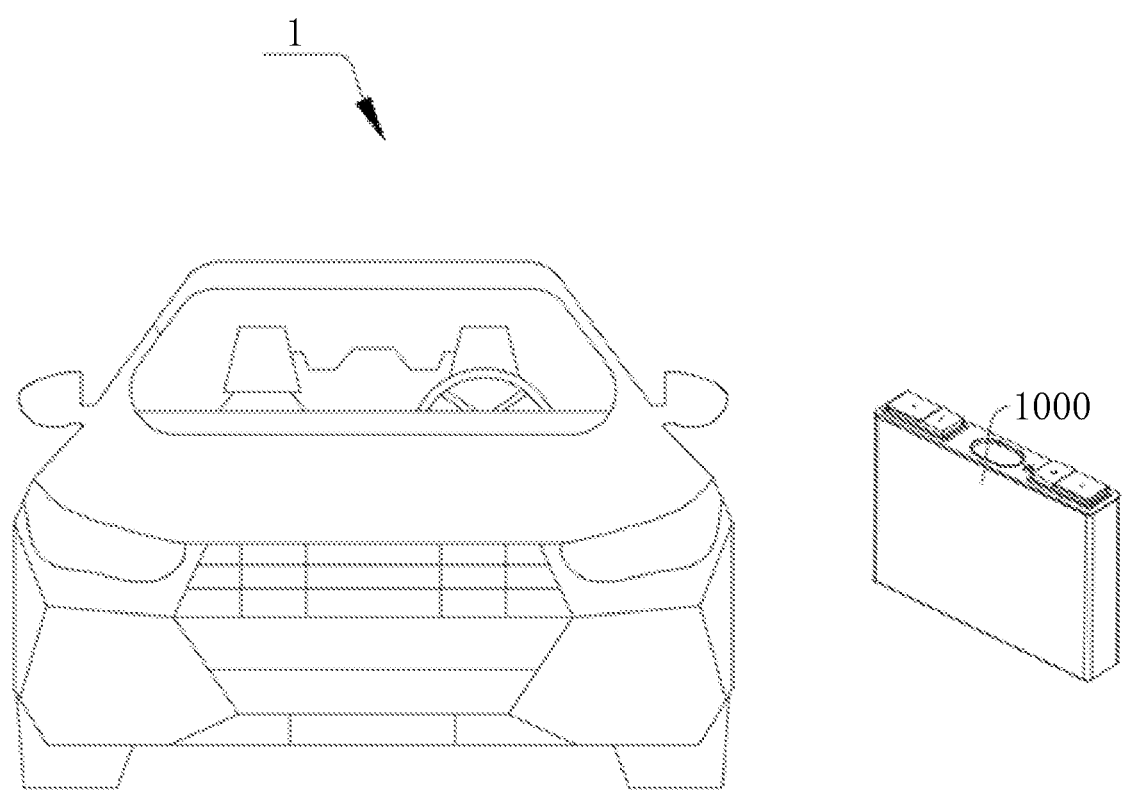
FIG. 12 is a schematic structural view of an electricity-consumption device provided in an embodiment of the present disclosure.

In this embodiment, the hollow hole 14 is a round hole with the depth of S. The protrusion 470 is a conical frustum with the height of h3. The radius (including the maximum radius) of the protrusion 470 is less than the radius of the hollow hole 14. A ratio of the radius R1 of the hollow hole 14 to the maximum radius R2 of the protrusion 470 satisfies: R1: R2=1.05-2.45 (as illustrated in FIG. 10). The gap d2 (FIG. 10) between the hole wall of the hollow hole 14 and the peripheral wall of the protrusion 470 is in the range from 1.05 mm to 2.45 mm, including 1.05 mm and 2.45 mm. In this embodiment, the specific value of the gap d2 is 1.15 mm. In this range, there is a sufficient error margin for assembly between the first lower plastic member 10 and the top cover 40. In addition, there is no shaking caused by inaccurate positioning between the first lower plastic member 10 and the top cover 40 due to an excessive gap. In this embodiment, the protrusion 470 is disposed at a position corresponding to the liquid-injection hole 471. The liquid-injection recess 47 is first defined, and then the liquid-injection hole 471 extends through the groove bottom-wall of the liquid-injection recess 47 and protrusion 470. In this way, the electrolyte injected can be prevented from spilling over an outer surface of the top cover 40, thereby ensuring that the liquid-injection hole 471 is not blocked and liquid-injection efficiency is higher. Meanwhile, the protrusion 470 is positioned in the hollow hole 14 and is at a distance from the hollow hole 14. Therefore, when the first-lower-plastic-member body 11 is assembled, precision requirements for parts aligned and assembled with the liquid-injection hole 471 can be reduced, thereby reducing production costs and improving assembly efficiency.

As illustrated in FIG. 2, FIG. 3, FIG. 9, FIG. 10, and FIG. 11, the sealing plug 49 is mounted in the liquid-injection recess 47 and the liquid-injection hole 471. The plug body 491 extends through the liquid-injection hole 471 and the hollow hole 14, and protrudes from the second surface 112 of the first-lower-plastic-member body 11. The first connector 310 is connected between the end cover assembly 100 and the electrode assembly 400. The first tab 400a is fixed to the first connector 310. In the length direction of the first connector 310, the extension section 401a exceeds an end of the first connector 310. In the thickness direction of the end cover assembly 100, the extension section 401a blocks the hollow hole 14, including partial blocking and entire blocking. In the thickness direction of the end cover assembly 100, the plug body 491 supports the extension section 401a, so that the gap d1 (FIG. 9) is defined between the extension section 401a and the second mounting face 412 of the top cover 40.

The first pole 50 extends through the first lower plastic member 10 at one side of the first lower plastic member 10 away from the hollow hole 14 and is electrically connected to the first tab 400a. The plug body 491 of the sealing plug 49 supports the extension section 401a of the first tab 400a extending above the hollow hole 14, so that the extension section 401a of the first tab 400a is prevented from being bent and warped towards the top cover 40 and abutting against the top cover 40 (such as the protrusion 470) due to an influence of environmental factors such as collision, heating, and the like. Thus, a short circuit between the first tab 400a and the top cover 40 due to an electrical connection between the first tab 400a and the top cover 40 is prevented. Therefore, the safety performance of the battery can be effectively protected.

In the thickness direction of the end cover assembly 100, the gap d1 between the extension section 401a and the second mounting face 412 of the top cover 40 is in the range from 2 mm to 8 mm, such as 3 mm, 4 mm, 4.5 mm, 5 mm, 6 mm, etc., and including 2 mm and 8 mm. In this embodiment, the specific value is 3.5 mm. With this value, a sufficient gap may be ensured to prevent the top cover 40 and the first tab 400a from being short-circuited, and the first tab 400a is prevent from being excessively bent and broken due to an excessive gap.

In the thickness direction of the end cover assembly 100, the height h1 of part of the plug body 491 protruding from the second surface 112 is in the range from 0.8 mm to 4.8 mm, including 0.8 mm and 4.8 mm. In this embodiment, the specific value of h1 is 1.2 mm. With this value, the extension section 401a can be ensured to be supported, and the extension section 401a is prevented from being in contact with the top cover 40 due to the bending of the extension section 401a, thereby avoiding the short circuit. In addition, in this height range, the minimum value ensures that the plug body 491 can effectively support the first tab 400a, and the first tab 400a is prevented from being connected to the top cover 40 when the first tab 400a is bent. Moreover, an unwanted gap due to the extension section 401a of the first tab 400a being lifted too high is avoided, thereby avoiding wasting the internal space of the energy-storage apparatus 1000, and avoiding reducing the energy density of the energy-storage apparatus 1000.

As illustrated in FIG. 2, FIG. 3, FIG. 6, FIG. 7, in this embodiment, the first lower plastic member 10 includes a first protective wall 19, and defines a first through-groove 117 at the other end of the first lower plastic member 10. The first through-groove 117 is configured to accommodate the flange portion 52 of the first pole 50 of the energy-storage apparatus 1000. The second body 312 of the first connector 310 is mounted to the flange portion 52 of the first pole 50 and is connected to the flange portion 52 of the first pole 50 by welding or the like. The first tab 400a is connected to and is welded with the first body 311 of the first connector 310. In addition, an insulating film 360 (as illustrated in FIG. 2) is sandwiched between the first body 311 and the second body 312. The insulating film 360 includes an insulating adhesive and a protective film. The second body 312, part of the insulating film 360, and the flange portion 52 overlap in the thickness direction of the top cover 40.

In this embodiment, the first protective wall 19 is substantially U-shaped. The first protective wall 19 includes a first sub-wall 191 and two second sub-walls 192. The first sub-wall 191 and the second sub-wall 192 each are a stripe-shaped protrusion. The first sub-wall 191 protrudes from the second surface 112 at one end of the second surface 112 and is close to the hollow hole 14. The two second sub-walls 192 protrude from the second surface 112 at two opposite sides of the second surface 112. The two second sub-walls 192 are connected to two ends of the first sub-wall 191. The two second sub-walls 192, the first sub-wall 191, and part of the second surface 112 cooperatively define a first limiting groove A. The first connector 310 and the first tab 400a are accommodated in the first limiting groove A. In practice, the first protective wall 19 is positioned outside three edges of the first connector 310, and is configured for limiting the first connector 310 and preventing the first connector 310 from being bent and misaligned.

In an embodiment, the height of the first protective wall 19 protruding from the second surface 112 is greater than a sum of the thickness of the first connector 310, the thickness of the insulating film 360, and the thickness of the first tab 400a. It is ensured that the first connector 310 and the first tab 400a may be positioned in the U-shaped groove defined by the first protective wall 19 in the thickness direction of the end cover assembly 100. Therefore, a welding portion between the first connector 310 and the first tab 400a is avoided from being bumped during subsequent assembly, thereby avoiding the first tab from being fractured. Meanwhile, after adhesiveness of the insulating film 360 that matches the first connector 310 and the first tab 400a fails, the insulating film 360 can be prevented from drifting out of the first protective wall 19, thereby avoiding insulation failure.

In an embodiment, the first-lower-plastic-member body 11 further includes a strip-shaped support rib 18. The support rib 18 protrudes from the second surface 112. The support rib 18 is positioned at one side of the hollow hole 14, and positioned between the hollow hole 14 and a position at which the first pole 50 of the energy-storage apparatus 1000 is mounted. The support rib 18 is positioned in the first limiting groove A. In the width direction, the support rib 18 has two ends each connected to the second sub-wall 192. In the thickness direction of the first-lower-plastic-member body 11, the first connector 310 blocks (partially or completely) the support rib 18. It may also be understood that the support rib 18 supports the first connector 310. The support rib 18 improves a structural strength of the first-lower-plastic-member body 11 in the width direction of the first-lower-plastic-member body 11 to avoid bending of the first-lower-plastic-member body 11. In addition, the first connector 310 is configured to support an extension portion of the first connector 310, so that the first connector 310 tends to be flat and is prevented from being damaged due to bending.

In this embodiment, the support rib 18 has a H-shaped bar. The support rib 18 at least includes one first sub-rib 181 extending in the length direction and two second sub-ribs 182 extending in the width direction. The first sub-rib 181 is connected between the two second sub-ribs 182. That is, it may be understood that the first sub-rib 181 and the two second sub-ribs 182 are disposed in an intersected manner. The support rib 18 is configured to support the extension portion, away from the first pole 50, of the first connector 310 (having poor metal strength). Therefore, the first connector 310 is prevented from being bent towards the hollow hole 14 under a pressure towards the top cover 40, thereby avoiding the short circuit of the battery due to the electrical connection between the first tab 400a and the top cover 40.

In an embodiment, the height h2 of the support rib 18 protruding from the second surface 112 is less than the height h1 of part of the plug body 491 protruding from the second surface 112. The support rib 18 can prevent the first connector 310 from being bent towards the top cover 40. The height of the support rib 18 protruding from the second surface 112 is less than the height of part of the plug body 491 protruding from the second surface 112. Thus, the first connector 310 can be effectively prevented from driving the extension section 401a of the first tab 400a to bend towards the top cover 40. The height of the support rib 18 is adapted to the thickness of the first connector 310. The height of part of the plug body 491 protruding from the second surface 112 is adapted to a height of the extension section 401a exceeding the first connector 310. Therefore, the first connector 310 and the first tab 400a tend to be flat as a whole, thereby avoiding warpage due to bending of the first connector 310 or the first tab 400a during subsequent use.

As illustrated in FIG. 2, FIG. 5, FIG. 6, FIG. 8, and FIG. 11, the lower plastic assembly 30 further includes a second-lower-plastic-member body 21. The second-lower-plastic-member body 21 has a third surface 211, a fourth surface 212 positioned facing away from the third surface 211, and a second protective wall 29. The second lower plastic member 20 is stacked on the second mounting face 412 of the top cover 40. The third surface 211 is positioned facing towards and connected to the second mounting face 412. One end of the second lower plastic member 20 is spaced apart from one end of the first lower plastic member 10. The length direction of the second lower plastic member 20 and the length direction of the first lower plastic member 10 each are the same as the length direction of the top cover 40.

The second protective wall 29 includes a third sub-wall 291 and two fourth sub-walls 292. The third sub-wall 291 protrudes from the fourth surface 212 at one end of the fourth surface 212. The two fourth sub-walls 292 protrude from the fourth surface 212 at two opposite sides of the fourth surface 212. The two fourth sub-walls 292 are connected to two ends of the third sub-wall 291. The two fourth sub-walls 292, the third sub-wall 291, and part of the fourth surface 212 cooperatively define a second limiting groove B. The second connector 320 and the second tab 400b of the electrode assembly 400 are accommodated in the second limiting groove B.

The second-lower-plastic-member body 21 defines a second through-groove 25 at the other end of the second-lower-plastic-member body 21. The second through-groove 25 is configured to accommodate the flange portion 62 of the second pole 60 of the energy-storage apparatus 1000. The third body 321 of the second connector 320 is connected to the flange portion 62 of the second pole 60 by welding or the like. The second tab 400b is fixed to the third body 321 of the second connector 320. The third body 321 and the fourth body 322 are welded with the second tab 400b. In addition, an insulating film 360 (as illustrated in FIG. 2) is sandwiched between the third body 321 and the fourth body 322. The insulating film 360 includes an insulating adhesive and a protective film.

In this embodiment, the height of the second protective wall 29 protruding from the fourth surface 212 is greater than a sum of the thickness of the second connector 320, the thickness of the insulating film 360, and the thickness of the second tab 400b of the electrode assembly 400. It is ensured that the second connector 320 and the second tab 400b may be positioned in the U-shaped groove defined by the second protective wall 29 in the thickness direction of the end cover assembly 100. Therefore, a welding portion between the second connector 320 and the second tab 400b is avoided from being bumped during subsequent assembly, thereby avoiding the second tab 400b from being fractured. Meanwhile, after adhesiveness of the insulating film 360 that matches the second connector 320 and the second tab 400b fails, the insulating film 360 can be prevented from drifting out of the second protective wall 29, thereby avoiding causing insulation failure.

In this embodiment, the fourth surface 212 of the second-lower-plastic-member body 21 has a first region 212a, a connection surface 212c, and a second region 212b that are disposed in sequence in the length direction of the second-lower-plastic-member body 21. The connection surface 212 is connected to the first region 212a and the second region 212b at two opposite sides of the connection surface 212c. It can be understood that the fourth surface 212 is a stepped surface.

The connection surface 212c is an inclined surface. In the thickness direction of the second-lower-plastic-member body 21, the height of the first region 212a is greater than the height of the second region 212b. That is, there is a height difference between the first region 212a and the second region 212b that are positioned at two sides of the connecting surface 212c. In the thickness direction of the second-lower-plastic-member body 21, the height difference between the first region 212a and the second region 212b is in the range from 0.25 mm to 2.85 mm, including 0.25 mm and 2.85 mm. In this embodiment, the specific value is 1.05 mm. In this height difference range, a small value of the height difference is adapted to the thickness of the first connector 310. A large value of the height difference avoids an excessively recessed depth in the second region. Therefore, the excessively thin wall thickness in the second region 212b is avoided, thereby avoiding reducing the structural strength of the second-lower-plastic-member body 21.

The second connector 320 is mounted on the fourth surface 212. The third body 321 and the fourth body 322 of the second connector 320 are positioned in the second region 212b. The third body 321 is fixedly connected to the flange portion 62 of the second pole 60. In the thickness direction of the second-lower-plastic-member body 21, the second tab 400b is fixedly connected to the fourth body 322. The second tab 400b is flush with a surface of the fourth body 322 positioned facing away from the second-lower-plastic-member body 21. The second tab 400b is mounted on the fourth body 322 and the first region 212a.

In this embodiment, the fourth surface 212 of the second-lower-plastic-member body 21 is not a flat surface, and regions with different heights are formed at intervals by an inclined surface. In the thickness direction, the second region 212b, which is lower than the first region 212a, is configured for accommodating and wrapping the fourth body 322 (a portion with a thicker thickness) of the second connector 320 which is welded with the second tab 400b. The second tab 400b bent keeps flush with a surface of the fourth body 322 of the second connector 320 positioned facing away from the second lower plastic member 20. Therefore, the thickness space, of the second lower plastic member 20, occupied by the second connector 320 can be reduced as a whole. For the whole system of the energy-storage apparatus 1000, a gap at the second connector 320 corresponding to a negative electrode side is reduced as a whole, thereby improving the energy density of the energy-storage apparatus 1000.

For the energy-storage apparatus 1000 in the embodiments of the present disclosure, with the arrangement of the first connector folded and the second connector folded, the gap between the end cover assembly 100 and the electrode assembly 400 is reduced. Therefore, the utility rate of the space inside the energy-storage apparatus 1000 is improved, and the energy density of the energy-storage apparatus 1000 is further improved. After the first connector 310 is folded and the second connector 320 is folded, the gap between the tab fixedly connected to the first connector 310 and the second connector 320 and the top cover 40 is reduced. The plug body 491 of the sealing plug 49 supports the extension section 401a of the first tab 400a extending above the liquid-injection hole 471, so that the extension section 401a of the first tab 400a is prevented from being bent and warped towards the top cover 40 and abutting against the top cover 40 due to the influence of environmental factors such as collision, heating, and the like. Thus, the short circuit between the first tab 400a and the top cover 40 is prevented. Therefore, the energy density of the energy-storage apparatus 1000 can be further increased while the safety performance of the energy-storage apparatus 1000 is improved.

It may be understood that according to specific contents in the above embodiments, the following can be confirmed. In this embodiment, the lower plastic assembly 30 includes the first lower plastic member 10 and the second lower plastic member 20. The first-lower-plastic-member body 11 has the first surface 111, the second surface 112 positioned facing away from the first surface 111, and the first protective wall 19. The first protective wall 19 includes the first sub-wall 191 and the two second sub-walls 192. The first sub-wall 191 protrudes from the second surface 112 at one end of the second surface 112 of the first-lower-plastic-member body 11. The two second sub-walls 192 protrude from the second surface 112 at the two opposite sides of the second surface 112. The two second sub-walls 192 are connected to the two ends of the first sub-wall 191. The two second sub-walls 192, the first sub-wall 191, and the part of the second surface 112 cooperatively define the first limiting groove A. The first connector 310 and the first tab 400a are accommodated in the first limiting groove A. The insulating film 360 is further stacked with the first connector 310. The height of the first protective wall 19 protruding from the second surface 112 is greater than the sum of the thickness of the first connector 310, the thickness of the insulating film 360, and the thickness of the first tab 400a. It is ensured that the first connector 310 and the first tab 400a may be positioned in the U-shaped groove defined by the first protective wall 19 in the thickness direction of the end cover assembly. Therefore, the welding portion between the first connector 310 and the first tab 400a is avoided from being bumped during the subsequent assembly, thereby avoiding the first tab 400a from being fractured. Meanwhile, after the adhesiveness of the insulating adhesive that matches the first connector 310 and the first tab 400a fails, the insulating adhesive may be prevented from drifting out of the first protective wall 19, thereby avoiding the insulation failure.

The second-lower-plastic-member body 21 has the third surface 211, the fourth surface 212 facing away from the third surface 211, and the second protective wall 29. The second protective wall 29 includes the third sub-wall 291 and the two fourth sub-walls 292. The third sub-wall 291 protrudes from the fourth surface 212 at one end of the fourth surface 212. The two fourth sub-walls 292 protrude from the fourth surface 212 at the two opposite sides of the fourth surface 212. The two fourth sub-walls 292 are connected to the third sub-wall 291 at the two ends of the third sub-wall 291. The two fourth sub-walls 292, the third sub-wall 291, the part of the fourth surface 212 cooperatively define the second limiting groove B. The second connector 320 and the second tab 400b of the electrode assembly 400 are accommodated in the second limiting groove B. The insulating film 360 is further stacked with the second connector 320. The height of the second protective wall 29 protruding from the fourth surface 212 is greater than the sum of the thickness of the second connector 320, the thickness of the insulating film 360, and the thickness of the second tab 400b of the electrode assembly 400. It is ensured that the second connector 320 and the second tab 400b may be positioned in the U-shaped groove defined by the second protective wall 29 in the thickness direction of the end cover assembly 100. Therefore, the welding portion between the second connector 320 and the second tab 400b is avoided from being bumped during the subsequent assembly, thereby avoiding the second tab 400b from being fractured. Meanwhile, after the adhesiveness of the insulating adhesive that matches the second connector 320 and the second tab 400b fails, the insulating adhesive may be prevented from drifting out of the second protective wall 29, thereby avoiding the insulation failure.

The fourth surface 212 of the second-lower-plastic-member body 21 has the first region 212a, the connection surface 212c, and the second region 212b that are disposed in sequence in the length direction of the second-lower-plastic-member body 21. The connection surface 212c is connected to the first region 212a and the second region 212b at the two opposite sides of the connection surface 212c. In the thickness direction of the second-lower-plastic-member body 21, the height of the first region 212a is greater than the height of the second region 212b. The third body 321 is connected to and partially stacked with the fourth body 322. The fourth body 322 is mounted in the second region 212b. In the thickness direction of the second-lower-plastic-member body 21, the surface of the fourth body 322 positioned facing towards the second-lower-plastic-member body 21 is flush with the first region 212a of the fourth surface 212. The second tab 400b is fixedly connected to the fourth body 322, and partially positioned in the first region 212a. In this embodiment, the fourth surface 212 of the second-lower-plastic-member body 21 is not a flat surface, and regions with different heights are formed. In the thickness direction, the second region 212b, which is recessed relative to the first region 212a towards the top cover 40, is configured for accommodating and wrapping the fourth body 322 (the portion with the thicker thickness) of the second connector 320 which is welded with the second tab 400b. The second tab 400b bent keeps flush with the surface of the fourth body 322 of the second connector 320 positioned facing away from the second lower plastic member 20. Therefore, the thickness space, of the second lower plastic member, occupied by the second connector 320 may be reduced as a whole. For the whole system of the energy-storage apparatus 1000, the gap at the second connector 320 is reduced, and the energy density of the whole energy-storage apparatus is improved.

The above embodiments in the present disclosure are described in detail. Principles and implementation manners of the present disclosure are elaborated with specific examples herein. The above illustration of embodiments is used to help to understand methods and core ideas of the present disclosure. At the same time, for those skilled in the art, according to ideas of the present disclosure, there will be changes in specific implementation manners and application scope. In summary, contents of this specification may not be understood as limitation on the present disclosure.

What is claimed is:

1. An energy-storage apparatus comprising:
   a housing defining an accommodating cavity and an opening;
   an electrode assembly having a first tab, the first tab having an extension section;
   a first pole comprising a post portion and a flange portion;
   a first connector having one end connected to the first tab and the other end connected to the flange portion of the first pole; and
   an end cover assembly having a top cover, a sealing plug, and a lower plastic assembly; wherein the top cover has a first mounting face and a second mounting face positioned facing away from the first mounting face in a thickness direction of the top cover, and the top cover further defines a liquid-injection hole extending through the first mounting face and the second mounting face; wherein
   the sealing plug has a plug body;
   the lower plastic assembly at least comprises a first-lower-plastic-member body, the first-lower-plastic-member body has a first surface and a second surface positioned facing away from the first surface in a thickness direction of the first-lower-plastic-member body, and the first-lower-plastic-member body defines a hollow hole extending through the first surface and the second surface; and in the thickness direction of the end cover assembly, a height h1 of part of the plug body protruding from the second surface is in a range from 0.8 mm to 4.8 mm;
   the first-lower-plastic-member body is assembled on the second mounting face, and the liquid-injection hole is positioned facing towards and is in communication with the hollow hole; and the sealing plug seals the liquid-injection hole, and the plug body extends through the liquid-injection hole and the hollow hole, and protrudes from the second surface;

the end cover assembly seals the opening, and the electrode assembly is disposed in the accommodating cavity; the first tab is connected to the first connector; and the extension section exceeds an end of the first connector in a length direction of the first connector, and blocks the hollow hole and the liquid-injection hole in a thickness direction of the end cover assembly;

the plug body supports the extension section in the thickness direction of the end cover assembly, and a gap d1 is defined between the extension section and the second mounting face of the top cover; and the gap d1 between the extension section and the second mounting face of the top cover is in a range from 2 mm to 8 mm.

2. The energy-storage apparatus of claim 1, wherein the top cover defines a liquid-injection recess recessed from the first mounting face, and a protrusion protrudes from the second mounting face; in the thickness direction of the top cover, the liquid-injection hole extends through a groove bottom-wall of the liquid-injection recess and the protrusion, the protrusion is accommodated in the hollow hole, the sealing plug has a cover body accommodated in the liquid-injection recess, a minimum gap d2 is defined between a hole wall of the hollow hole and a peripheral wall of the protrusion, and the protrusion is exposed beyond the second surface of the first-lower-plastic-member body.

3. The energy-storage apparatus of claim 2, wherein the minimum gap d2 between the hole wall of the hollow hole and the peripheral wall of the protrusion is in a range from 0.05 mm to 2.85 mm.

4. The energy-storage apparatus of claim 1, wherein the first-lower-plastic-member body further comprises a support rib, and the first connector is connected to the second surface of the first-lower-plastic-member body and is fixedly connected to the flange portion of the first pole; and the support rib protrudes from the second surface and is positioned at one side of the hollow hole; and in the thickness direction of the first-lower-plastic-member body, the support rib abuts against the first connector.

5. The energy-storage apparatus of claim 4, wherein the support rib comprises at least one first sub-rib and at least one second sub-rib, and the at least one first sub-rib and the at least one second sub-rib are disposed in an intersected manner.

6. The energy-storage apparatus of claim 4, wherein a height h2 of the support rib protruding from the second surface is less than the height h1 of part of the plug body protruding from the second surface.

7. The energy-storage apparatus of claim 2, wherein a ratio of a radius R1 of the hollow hole to a maximum radius R2 of the protrusion satisfies: R1: R2=1.05-2.45.

8. The energy-storage apparatus of claim 4, wherein the first-lower-plastic-member body further comprises a first protective wall, the first protective wall comprises a first sub-wall and two second sub-walls, the first sub-wall protrudes from the second surface at one end of the second surface defining the hollow hole, and the two second sub-walls protrude from the second surface at two opposite sides of the second surface; and the two second sub-walls are connected to the first sub-wall at two ends of the first sub-wall, and the two second sub-walls, the first sub-wall, and part of the second surface cooperatively define a first limiting groove; and the first connector and the first tab are accommodated in the first limiting groove.

9. The energy-storage apparatus of claim 8, wherein the first connector comprises a first body and a second body connected to one side of the first body, the first body and the second body are partially connected and folded relative to each other along a junction between the first body and the second body, an insulating film is further sandwiched between the first body and the second body, and a height of the first protective wall protruding from the second surface is greater than a sum of a thickness of the first connector, a thickness of the insulating film, and a thickness of the first tab.

10. The energy-storage apparatus of claim 8, wherein the first connector comprises a first body and a second body connected to one side of the first body, the first body and the second body are partially connected and folded relative to each other along a junction between the first body and the second body, the first tab is fixedly connected to the first body, and the extension section exceeds the first body; and the second body has one end that is positioned facing away from the first body and fixedly connected to the flange portion of the first pole.

11. The energy-storage apparatus of claim 1, wherein the energy-storage apparatus comprises a second connector, and the electrode assembly further comprises a second tab; and the lower plastic assembly further comprises a second-lower-plastic-member body, the second-lower-plastic-member body has a third surface and a fourth surface positioned facing away from the third surface in a thickness direction of the second-lower-plastic-member body, and the second-lower-plastic-member body further comprises a second protective wall;

the second protective wall comprises a third sub-wall and two fourth sub-walls, the third sub-wall protrudes from the fourth surface at one end of the fourth surface, and the two fourth sub-walls protrude from the fourth surface at two opposite sides of the fourth surface; and the two fourth sub-walls are connected to two ends of the third sub-wall, and the two fourth sub-walls, the third sub-wall, and part of the fourth surface cooperatively define a second limiting groove; and the second connector and the second tab of the electrode assembly are accommodated in the second limiting groove.

12. The energy-storage apparatus of claim 11, wherein an insulating film is further stacked on the second connector, and a height of the second protective wall protruding from the fourth surface is greater than a sum of a thickness of the second connector, a thickness of the insulating film, and a thickness of the second tab.

13. The energy-storage apparatus of claim 11, wherein the energy-storage apparatus further comprises a second pole, the second pole has a flange portion, and the fourth surface of the second-lower-plastic-member body has a first region and a second region connected to the first region in a length direction of the second-lower-plastic-member body; and in the thickness direction of the second-lower-plastic-member body, a height of the first region is greater than a height of the second region;

the second connector comprises a third body and a fourth body connected to one side of the third body, and the third body and the fourth body are partially connected and folded relative to each other along a junction between the third body and the fourth body;

the second connector is mounted on the fourth surface, the third body and the fourth body are mounted in the second region, the third body is fixedly connected to the flange portion of the second pole, and in the thickness direction of the second-lower-plastic-member body, the second tab is fixedly connected to the fourth body, and the second tab is flush with a surface of the fourth body positioned facing away from the second-lower-plastic-member body.

14. The energy-storage apparatus of claim 13, wherein the fourth surface has a connection surface, the connection surface is an inclined surface, and the connection surface is connected to the first region and the second region at two opposite sides of the connection surface; and in the thickness direction of the second-lower-plastic-member body, a height difference between the first region and the second region is in a range from 0.25 mm to 2.85 mm.

15. An electricity-consumption device comprising an energy-storage apparatus, wherein the energy-storage apparatus is configured to power the electricity-consumption device, and comprises:
   a housing defining an accommodating cavity and an opening;
   an electrode assembly having a first tab, the first tab having an extension section;
   a first pole comprising a post portion and a flange portion;
   a first connector having one end connected to the first tab and the other end connected to the flange portion of the first pole; and
   an end cover assembly having a top cover, a sealing plug, and a lower plastic assembly; wherein the top cover has a first mounting face and a second mounting face positioned facing away from the first mounting face in a thickness direction of the top cover, and the top cover further defines a liquid-injection hole extending through the first mounting face and the second mounting face; wherein
   the sealing plug has a plug body;
   the lower plastic assembly at least comprises a first-lower-plastic-member body, the first-lower-plastic-member body has a first surface and a second surface positioned facing away from the first surface in a thickness direction of the first-lower-plastic-member body, and the first-lower-plastic-member body defines a hollow hole extending through the first surface and the second surface; and in the thickness direction of the end cover assembly, a height h1 of part of the plug body protruding from the second surface is in a range from 0.8 mm to 4.8 mm;
   the first-lower-plastic-member body is assembled on the second mounting face, and the liquid-injection hole is positioned facing towards and is in communication with the hollow hole; and the sealing plug seals the liquid-injection hole, and the plug body extends through the liquid-injection hole and the hollow hole, and protrudes from the second surface;
   the end cover assembly seals the opening, and the electrode assembly is disposed in the accommodating cavity; the first tab is connected to the first connector; and the extension section exceeds an end of the first connector in a length direction of the first connector, and blocks the hollow hole and the liquid-injection hole in a thickness direction of the end cover assembly;
   the plug body supports the extension section in the thickness direction of the end cover assembly, and a gap d1 is defined between the extension section and the second mounting face of the top cover; and
   the gap d1 between the extension section and the second mounting face of the top cover is in a range from 2 mm to 8 mm.

16. The electricity-consumption device of claim 15, wherein the top cover defines a liquid-injection recess recessed from the first mounting face, and a protrusion protrudes from the second mounting face; in the thickness direction of the top cover, the liquid-injection hole extends through a groove bottom-wall of the liquid-injection recess and the protrusion, the protrusion is accommodated in the hollow hole, the sealing plug has a cover body accommodated in the liquid-injection recess, a minimum gap d2 is defined between a hole wall of the hollow hole and a peripheral wall of the protrusion, and the protrusion is exposed beyond the second surface of the first-lower-plastic-member body.

17. The electricity-consumption device of claim 16, wherein the minimum gap d2 between the hole wall of the hollow hole and the peripheral wall of the protrusion is in a range from 0.05 mm to 2.85 mm.

18. The electricity-consumption device of claim 15, wherein the first-lower-plastic-member body further comprises a support rib, and the first connector is connected to the second surface of the first-lower-plastic-member body and is fixedly connected to the flange portion of the first pole; and
   the support rib protrudes from the second surface and is positioned at one side of the hollow hole; and in the thickness direction of the first-lower-plastic-member body, the support rib abuts against the first connector.

19. The electricity-consumption device of claim 18, wherein the support rib comprises at least one first sub-rib and at least one second sub-rib, and the at least one first sub-rib and the at least one second sub-rib are disposed in an intersected manner.

20. The electricity-consumption device of claim 18, wherein a height h2 of the support rib protruding from the second surface is less than the height h1 of part of the plug body protruding from the second surface.

* * * * *